US012321677B2

(12) United States Patent
Hung et al.

(10) Patent No.: US 12,321,677 B2
(45) Date of Patent: Jun. 3, 2025

(54) NOISE SIMULATION SYSTEM

(71) Applicant: NANYA TECHNOLOGY CORPORATION, New Taipei (TW)

(72) Inventors: Kuo-Chiang Hung, New Taipei (TW); Tsung-Ho Li, New Taipei (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 18/610,245

(22) Filed: Mar. 19, 2024

(65) Prior Publication Data

US 2024/0232493 A1 Jul. 11, 2024

Related U.S. Application Data

(63) Continuation of application No. 17/378,799, filed on Jul. 19, 2021, now Pat. No. 11,966,680.

(51) Int. Cl.
*G06F 30/30* (2020.01)
*G06F 30/367* (2020.01)
*G06F 119/06* (2020.01)
*G06F 119/10* (2020.01)

(52) U.S. Cl.
CPC ........ *G06F 30/367* (2020.01); *G06F 2119/06* (2020.01); *G06F 2119/10* (2020.01)

(58) Field of Classification Search
CPC . G06F 30/367; G06F 2119/06; G06F 2119/10
See application file for complete search history.

(56) References Cited

U.S. PATENT DOCUMENTS

| | | | | |
|---|---|---|---|---|
| 6,870,436 B2* | 3/2005 | Grebenkemper | .... | H05K 1/0234 |
| | | | | 716/120 |
| 6,981,230 B1* | 12/2005 | Lin | ........ | G06F 30/367 |
| | | | | 716/115 |
| 7,233,889 B2* | 6/2007 | Takahashi | ............. | G06F 30/367 |
| | | | | 716/136 |
| 11,244,079 B2* | 2/2022 | Cocchini | ................. | H04L 9/001 |
| 2003/0042989 A1* | 3/2003 | Sakurai | ................ | H03B 5/1231 |
| | | | | 331/175 |
| 2010/0156523 A1* | 6/2010 | Kwon | .................. | H05K 1/0236 |
| | | | | 327/551 |
| 2015/0263746 A1* | 9/2015 | Shiraishi | ............. | H03M 1/0836 |
| | | | | 341/144 |
| 2016/0157355 A1* | 6/2016 | Paoletti | ................. | G06F 30/392 |
| | | | | 716/122 |
| 2020/0134110 A1* | 4/2020 | Ludwig | .................... | G06F 30/20 |
| 2020/0162051 A1* | 5/2020 | Taniguchi | ............ | H03H 7/0153 |

* cited by examiner

*Primary Examiner* — Jack Chiang
*Assistant Examiner* — Brandon Bowers
(74) *Attorney, Agent, or Firm* — CKC & Partners Co., LLC

(57) ABSTRACT

The disclosure provides a system to simulate a simulated noise on the power zone block of a substrate. The system comprises a signal trace and a signal generating circuit. The signal trace is disposed adjacent to the power zone block. The signal generating circuit is electrically coupled to the signal trace, configured to transmit an alternating current signal over the signal trace. The alternating current signal transmitted over the signal trace is configured to induce a simulated noise on the power zone block, and a waveform of the simulated noise is determined by a frequency of the alternating current signal.

8 Claims, 4 Drawing Sheets

NOISE SIMULATION SYSTEM

RELATED APPLICATIONS

This present application is a continuation application of U.S. patent application Ser. No. 17/378,799, filed Jul. 19, 2021, which is herein incorporated by reference in their entirety.

BACKGROUND

Field of Invention

The present invention relates to a noise simulation technology. More particularly, the present invention relates to a noise simulation system.

Description of Related Art

With the rapid advancement in high-speed data processing and computing technologies, the operation frequency of the IC chip is higher. In some cases, the design of the power transmit system in the printed circuit, such as the power plane and the ground plane, is associated to a power supply noise (i.e., a simultaneous switching noise) which may cause the IC chip cannot operate normally. Therefore, how to observe and simulate the power supply noise transmitted to the power plane of the designed printed circuit board is important. However, it is hard to directly generate the power supply noise on the power plane of the printed circuit board in a laboratory. Accordingly, what is needed is a noise simulation system to address the issues mentioned above.

SUMMARY

An aspect of the present invention is to provide a system capable for simulating a noise on the power zone block of a substrate. The system comprises a signal trace and a signal generating circuit. The signal trace is disposed adjacent to the power zone block. The signal generating circuit is electrically coupled to the signal trace, configured to transmit an alternating current signal over the signal trace. The alternating current signal transmitted over the signal trace is configured to induce a simulated noise on the power zone block, and a waveform of the simulated noise is determined by a frequency of the alternating current signal.

Another aspect of the present invention is to provide a system capable for simulating a noise on the power zone block of a substrate. The system comprises a plurality of signal traces and a signal generating circuit. The signal traces are disposed adjacent to a plurality of edges of the power zone block, respectively. The signal generating circuit is electrically coupled to the signal traces, configured to transmit a plurality of alternating current signals with different frequencies over the signal traces, respectively. The alternating current signals transmitted over the signal trace is configured to induce a simulated noise on the power zone block, wherein a waveform of the simulated noise is determined by the alternating current signals with different frequencies.

These and other features, aspects, and advantages of the present invention will become better understood with reference to the following description and appended claims.

In summary, the noise simulation system can generate the simulation noise on the power zone block of the substrate, by transmitting the alternating current signal over the signal trace, to simulate the power supply noise in actual situation.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
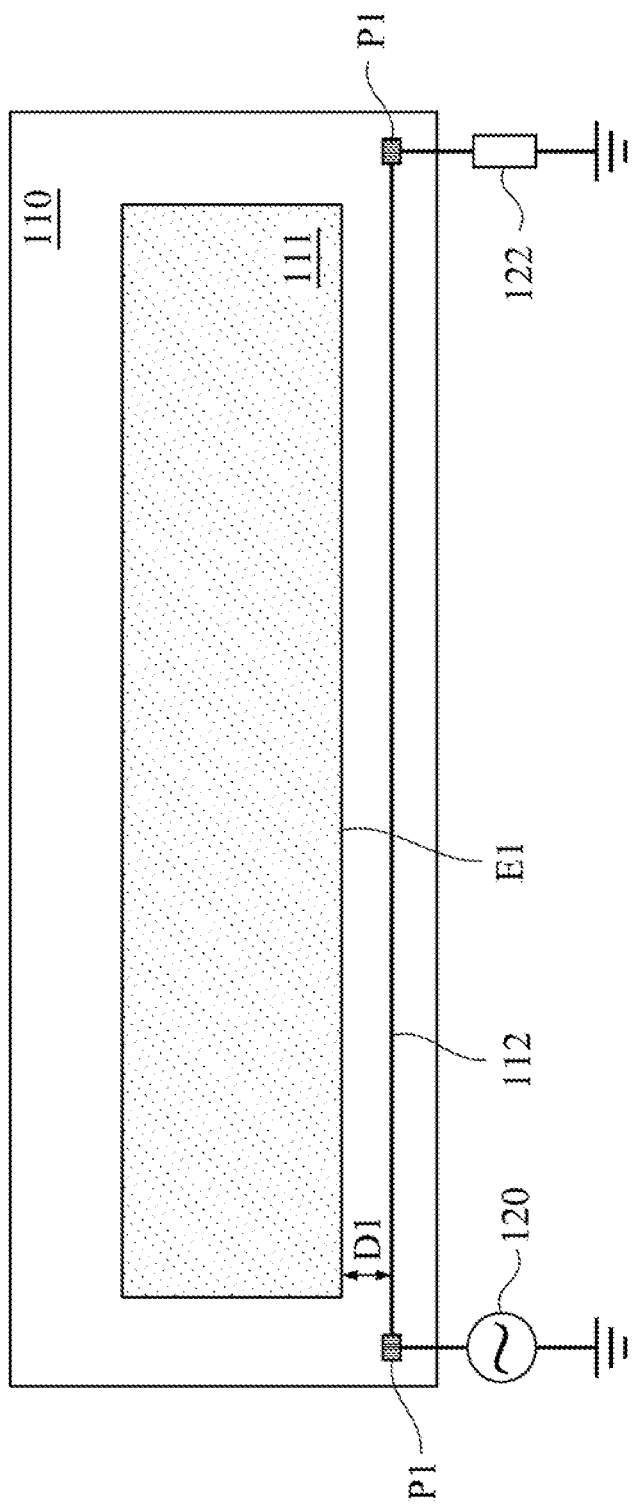
FIG. 1 is a schematic diagram of a noise simulation system in some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram of a noise simulation system 100 in some embodiments of the present disclosure. The noise simulation system 100 includes a substrate 110, a signal trace 112, a signal generating circuit 120 and a resistor 122. The substrate 110 may be implemented as a printed circuit board. In some embodiments of the disclosure, memory element, such as any type of random access memory, may be furnished on the substrate 110 (i.e., printed circuit board) to form a memory module (not shown). For example, the memory element may be implemented as static RAM, dynamic RAM, synchronous DRAM, Rambus DRAM, doble data rate RAM, or any other type of RAM.

The substrate 110, such as a printed circuit board, often includes planar layers of electrically conductive material separated by layers of dielectric material. One of the conductive layers may be considered as a power plane, and another of the conductive layers may be considered as a ground plane. A portion of the one of the conductive layers which is considered as the power plane can be patterned to form an electrically conductive power zone block 111. The power zone block 111 typically extends generally parallel to the plane of the substrate 110.

In actual computer system, when the memory element (i.e., DRAM) is operating, a noise (i.e., a power supply noise or a simultaneous switching noise) may be transmitted to the power zone block 111. However, it is hard to directly provide the noise to the power zone block 111 in the lab.

To consider the noise induced to the power zone block 111 in the actual situation, the signal generating circuit 120 is configured to generate an alternative current signal and transmit the alternative current signal over the signal trace to simulate a simulated noise on the power noise according to the alternative current signal. In other words, the signal trace 112, the signal generating circuit 120 and the resistor 122 can be consider as a noise simulation module. How to simulate a noise on the power zone lock will be described in detail in following embodiment.

In structure, the signal trace 112 is disposed adjacent to an edge E1 of the power zone block 111, and the signal trace 112 extends in parallel with the edge E1 of the power zone block 111. The signal generating circuit 120 and the resistor 122 are respectively coupled to two terminals of the signal trace 112. Specifically, a first terminal of the signal generating circuit 120 is electrically coupled to a first terminal of the signal trace 112. A first terminal of the resistor 122 is electrically coupled to a second terminal of the signal trace 112. The second terminals of each of the signal generating circuit 120 and the resistor 122 are grounded.

The signal generating circuit 120 is configured to transmit the alternating current signal, which is a single-end signal, over the signal trace 112. The alternating current signal transmitted over the signal trace 112 is configured to induce a simulated noise on the power zone block 111. A waveform of the simulated noise is determined by a frequency of the alternating current signal controlled by the signal generating circuit 120. In some embodiments, the waveform of the simulated noise can be detected by an EMI scanning device.

In addition, when the signal generating circuit 120 adjusts the frequency of the alternating current signal, the waveform of the simulated noise is detected by the EMI scanning device, simultaneously, such that a resonance frequency of the power zone block 111 can be determined according to the variety of the waveform of the simulated noise. In some embodiments, the frequency of the alternating current signal can be controlled in a range of 100 kHz~1 MHz. In addition, a resistance of the resistor 122 can be controlled to form a standing wave on the signal trace 112, according to the alternating current signal, to induce the simulated noise on the power zone block 111. In some embodiments, resistance of the resistor 122 can be 0 Ohm, 50 Ohm or 10000 Ohm.

It should be noted that, a distance D1 between the signal trace 112 and the edge E1 of the power zone block 111 is less than a threshold value, such that the simulated noise on the power zone block 111 can be induced from the alternating current signal transmitted over the signal trace 112, wherein the threshold value is less than 10 micrometer.

In some embodiments, the power zone block 111 and the signal trace 112 may be disposed in the same conductive layer, and each terminal of the signal trace 112 is electrically coupled to a pad P1 through vertical trace. During the noise simulation operation, the signal generating circuit 120 is electrically coupled to the first terminal of the signal trace 112 through the pad P1, and the resistor 122 is electrically coupled to the second terminal of the signal trace 112 through another pad P1. After the noise simulation operation, the signal generating circuit 120 and the resistor 122 can be removed from the substrate 110. In this case, a distance D1 between an edge E1 of the power zone block 111 and the signal trace 112 can be set in a range of 1~10 micrometer.

In other embodiments, the signal trace 112, the signal generating circuit 120 and the resistor 122 may be disposed on a support, and the support may be controlled to adjust the distance D1 between the edge E1 of the power zone block 111 and the signal trace 112 in a range of 1~10 micrometer.

Figure 2:
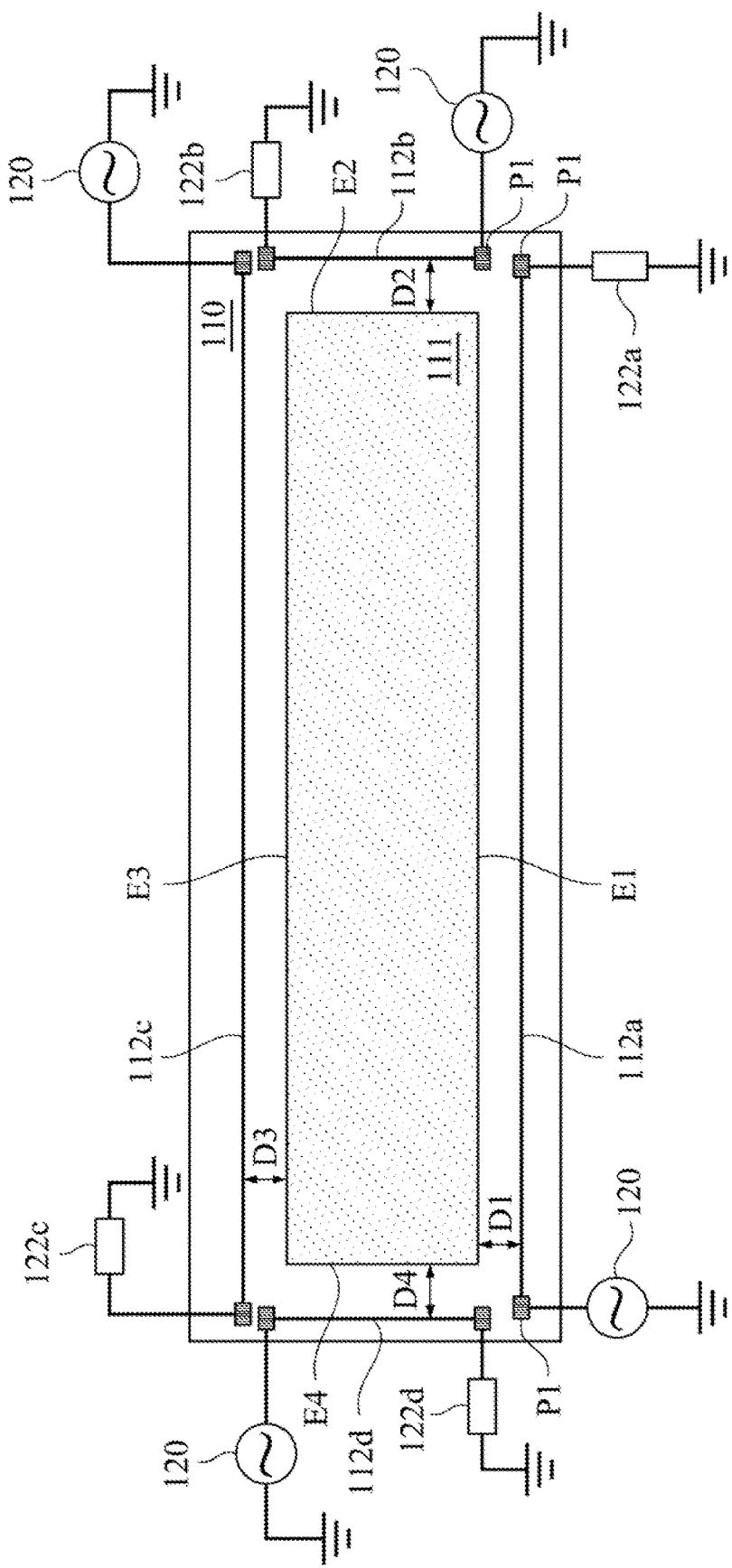
FIG. 2 is a schematic diagram of a noise simulation system in some embodiments of the present disclosure.

Reference is made to FIG. 2. FIG. 2 is a schematic diagram of a noise simulation system 100 in some embodiments of the present disclosure. The noise simulation system 100 includes a substrate 110, signal traces 112a~112d, a signal generating circuit 120 and resistors 122a~122d.

In structure, the signal trace 112a is disposed adjacent to an edge E1 of the power zone block 111, and the signal trace 112a extends in parallel with the edge E1 of the power zone block 111. The signal generating circuit 120 and the resistor 122a are respectively coupled to two terminals of the signal trace 112a. The signal trace 112b is disposed adjacent to an edge E2 of the power zone block 111, and the signal trace 112b extends in parallel with the edge E2 of the power zone block 111. The signal generating circuit 120 and the resistor 122b are respectively coupled to two terminals of the signal trace 112b.

The signal trace 112c is disposed adjacent to an edge E3 of the power zone block 111, and the signal trace 112c extends in parallel with the edge E3 of the power zone block 111. The signal generating circuit 120 and the resistor 122c are respectively coupled to two terminals of the signal trace 112c. The signal trace 112d is disposed adjacent to an edge E4 of the power zone block 111, and the signal trace 112d extends in parallel with the edge E4 of the power zone block 111. The signal generating circuit 120 and the resistor 122d are respectively coupled to two terminals of the signal trace 112d.

Specifically, the signal generating circuit 120 is electrically coupled to a first terminal of each of the signal traces 112a~112d. The first terminals of each of the resistor 122a~122d are electrically coupled to a second terminal of the signal traces 112a~112d, respectively. The second terminals of each of the resistor 122 are grounded.

Similarly, the signal generating circuit 120 is configured to transmit the alternating current signals with different frequencies, which are a single-end signal, over the signal trace 112a~112d, respectively. The alternating current signals transmitted over the signal trace 112a~112d are configured to induce a simulated noise on the power zone block 111. A waveform of the simulated noise is determined by the frequencies of the alternating current signals controlled by the signal generating circuit 120. In some embodiments, the waveform of the simulated noise can be detected by an EMI scanning device.

In addition, when the signal generating circuit 120 adjusts the frequencies of the alternating current signals, the waveform of the simulated noise is detected by the EMI scanning device, simultaneously, such that a resonance frequency of the power zone block 111 can be determined according to the variety of the waveform of the simulated noise. In some embodiments, the frequency of the alternating current signal can be controlled in a range of 100 kHz~1 MHz. In addition, resistances of the resistor 122a~122e can be respectively controlled to form standing waves on the signal trace 112a~112e to induce the simulated noise on the power zone block 111 according to the alternating current signals. In some embodiments, resistances of the resistors 122a~122e can be 0 Ohm, 50 Ohm or 10000 Ohm.

It should be noted that, the distances D1~D4 between the signal traces 112a~112d and edges E1~E4 of the power zone block 111 is less than a threshold value, such that the simulated noise on the power zone block 111 can be induced from the alternating current signals transmitted over the signal traces 112~112d, wherein the threshold value is less than 10 micrometer.

In some embodiments, the power zone block 111 and the signal traces 112a~112d may be disposed in the same conductive layer, and each terminal of the signal traces 112a~112d are electrically coupled to a pad P1 through vertical trace. During the noise simulation operation, the signal generating circuit 120 is electrically coupled to the first terminal of the signal traces 112a~112d through the corresponding pad P1, and the resistors 122a~122d are electrically coupled to the second terminal of the signal traces 112a~112d through another corresponding pad P1. After the noise simulation operation, the signal generating circuit 120 and the resistors 122a~122d can be removed from the substrate 110. In this case, distances D1~D4 between edges E1~E4 of the power zone block 111 and the signal traces 112a~112d can be set in a range of 1~10 micrometer.

In other embodiments, the signal trace 112a~112d, the signal generating circuit 120 and the resistor 122a~122d may be disposed on a support, and the support may be controlled to adjust the distances D1~D4 between the edges E1~E4 of the power zone block 111 and the signal trace 112a~112d in a range of 1~10 micrometer.

Figure 3:
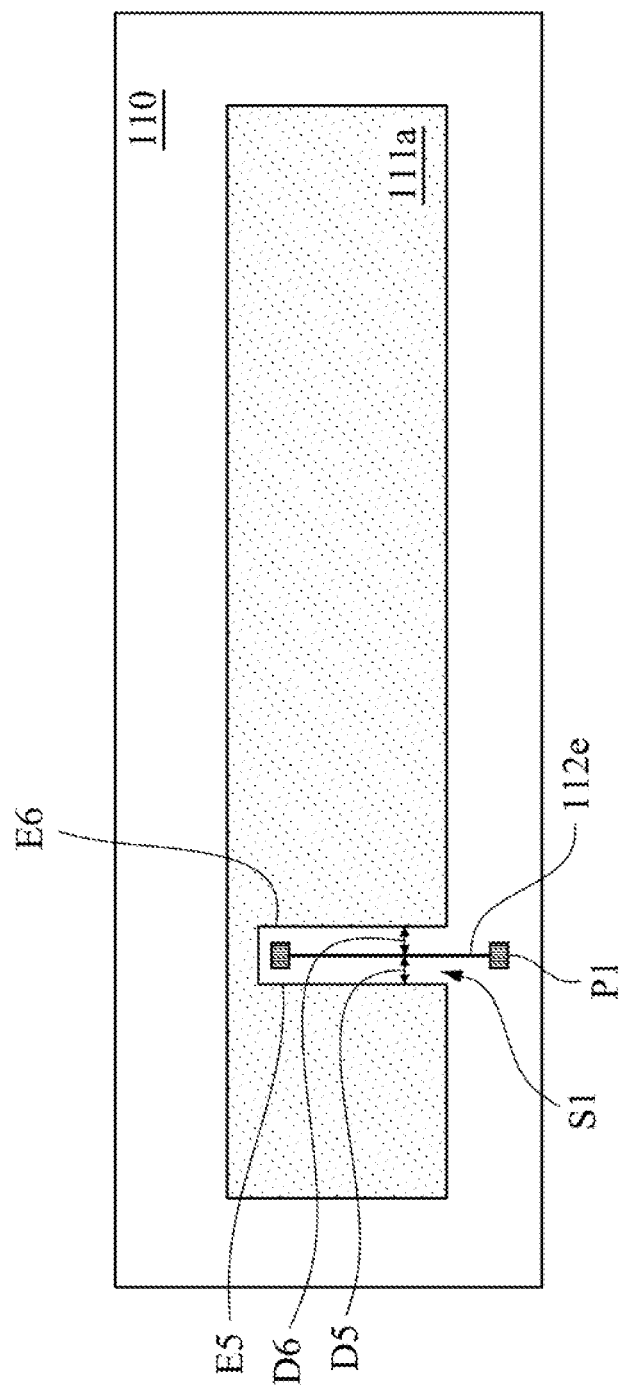
FIG. 3 is a schematic diagram of a noise simulation system in some embodiments of the present disclosure.

Reference is made to FIG. 3. FIG. 3 is a schematic diagram of a noise simulation system 100 in some embodiments of the present disclosure. The noise simulation system 100 includes a substrate 110, a signal trace 112e.

In structure, the signal trace 112e is disposed adjacent to a side E5 of a slit S1 on the power zone block 111a, and the signal trace 112e extends in parallel with the side E5 of the slit S1 on the power zone block 111a. The signal generating circuit 120 (not shown in FIG. 3) and the resistor 122 (not shown in FIG. 3) can be respectively coupled to two terminals of the signal trace 112e through the corresponding pad P1. The signal generating circuit 120 and the resistor 122 are described in the embodiment of FIG. 1, thus the description is omitted.

Similarly, the signal generating circuit 120 (not shown in FIG. 3) is configured to transmit the alternating current signal which, is a single-end signal, over the signal trace 112e. The alternating current signal transmitted over the signal trace 112e is configured to induce a simulated noise on the power zone block 111a. A waveform of the simulated noise is determined by the frequencies of the alternating current signal controlled by the signal generating circuit 120. In some embodiments, the waveform of the simulated noise can be detected by an EMI scanning device.

It should be noted that, the distances D5~D6 between the signal trace 112e and sides E5 and E6 of the slit S1 on the power zone block 111a is less than a threshold value, such that the simulated noise on the power zone block 111a can be induced from the alternating current signal transmitted over the signal traces 112e, wherein the threshold value is less than 10 micrometer.

In this way, no matter what shape the power zone block 111a is, the simulated noise can be induced on the power zone block 111a by transmitting the alternating current signal over the signal trace 112e, so that the waveform of the simulated noise can be detected by the EMI scanning device.

In some embodiments, the power zone block 111a and the signal trace 112e may be disposed in the same conductive layer, and each terminal of the signal trace 112e is electrically coupled to a pad P1 through vertical trace. During the noise simulation operation, the signal generating circuit 120 (not shown in FIG. 3) is electrically coupled to the first terminal of the signal trace 112e through the pad P1, and the resistor 122 (not shown in FIG. 3) is electrically coupled to the second terminal of the signal trace 112e through another pad P1. After the noise simulation operation, the signal generating circuit 120 (not shown in FIG. 3) and the resistor 122 (not shown in FIG. 3) can be removed from the substrate 110. In this case, a distance D5 between an edge E5 of the power zone block 111a and the signal trace 112e can be set in a range of 1~10 micrometer.

In other embodiments, the signal trace 112e, the signal generating circuit 120 (not shown in FIG. 3) and the resistor 122 (not shown in FIG. 3) may be disposed on a support, and the support may be controlled to adjust the distance D5 between the edge E5 of the power zone block 111 and the signal trace 112e in a range of 1~10 micrometer.

Figure 4:
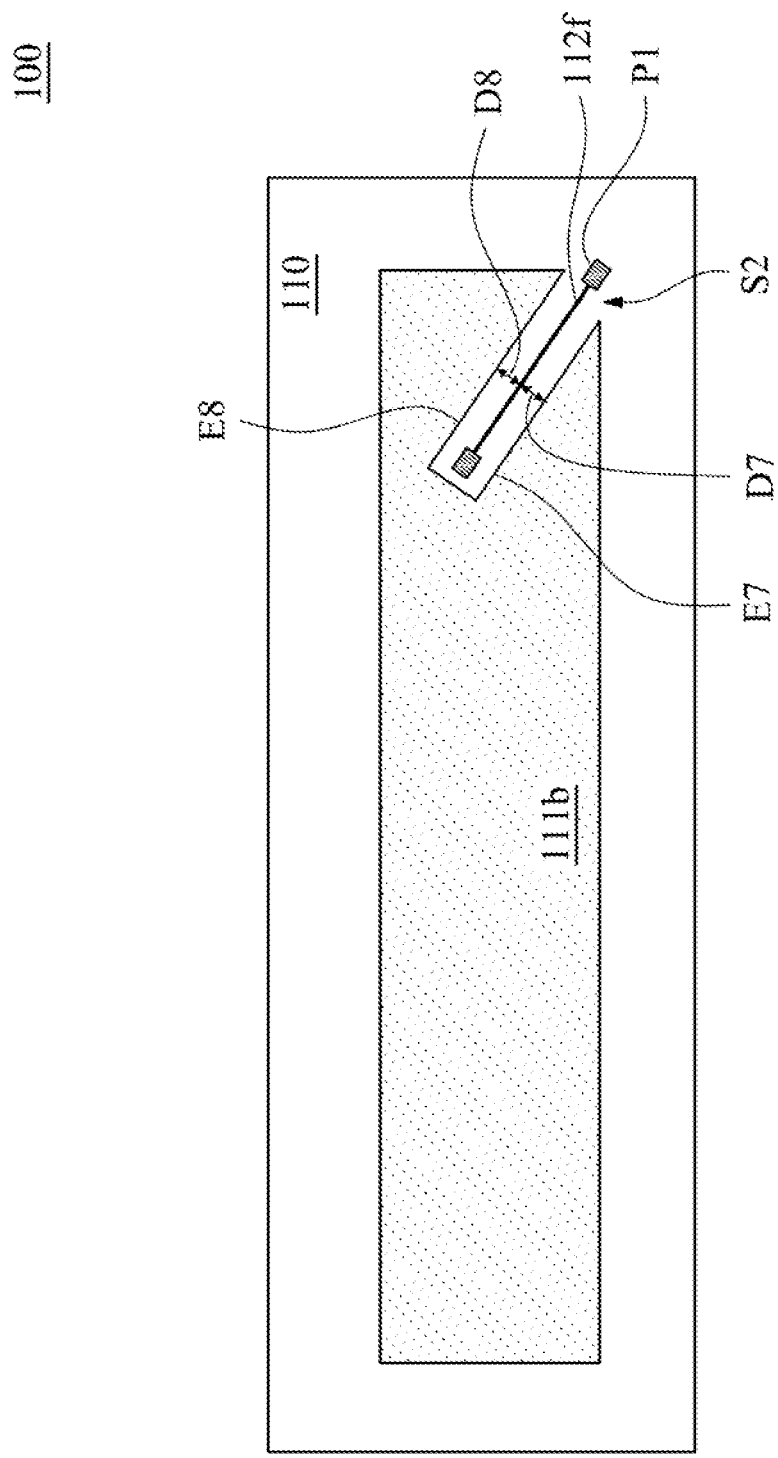
FIG. 4 is a schematic diagram of a noise simulation system in some embodiments of the present disclosure.

Reference is made to FIG. 4. FIG. 4 is a schematic diagram of a noise simulation system 100 in some embodiments of the present disclosure. The noise simulation system 100 includes a substrate 110, a signal trace 112f. The substrate 110 has a power zone block 111b with a slit S2 on a corner.

In structure, the signal trace 112f is disposed adjacent to a side E7 of the slit S2 on the power zone block 111b, and the signal trace 112f extends in parallel with the side E7 of the slit S2 on the power zone block 111b. The signal generating circuit 120 (not shown in FIG. 4) and the resistor 122 (not shown in FIG. 4) can be respectively coupled to two terminals of the signal trace 112f through the corresponding pad P1. The signal generating circuit 120 and the resistor 122 are described in the embodiment of FIG. 1, thus the description is omitted.

Similarly, the signal generating circuit 120 (not shown in FIG. 4) is configured to transmit the alternating current signal, which is a single-end signal, over the signal trace 112f. The alternating current signal transmitted over the signal trace 112f is configured to induce a simulated noise on the power zone block 111b. A waveform of the simulated noise is determined by the frequencies of the alternating current signal controlled by the signal generating circuit 120. In some embodiments, the waveform of the simulated noise can be detected by an EMI scanning device.

It should be noted that, the distances D7~D8 between the signal trace 112f and sides E7 and E8 of the slit S2 on the power zone block 111b is less than a threshold value, such that the simulated noise on the power zone block 111b can be induced from the alternating current signal transmitted over the signal traces 112f, wherein the threshold value is less than 10 micrometer.

In some embodiments, the power zone block 111b and the signal trace 112f may be disposed in the same conductive layer, and each terminal of the signal trace 112f is electrically coupled to a pad P1 through vertical trace. During the noise simulation operation, the signal generating circuit 120 (not shown in FIG. 4) is electrically coupled to the first terminal of the signal trace 112f through the pad P1, and the resistor 122 (not shown in FIG. 4) is electrically coupled to the second terminal of the signal trace 112f through another pad P1. After the noise simulation operation, the signal generating circuit 120 (not shown in FIG. 4) and the resistor 122f (not shown in FIG. 4) can be removed from the substrate 110. In this case, a distance D7 between an edge E7 of the power zone block 111b and the signal trace 112f can be set in a range of 1~10 micrometer.

In other embodiments, the signal trace 112e, the signal generating circuit 120 (not shown in FIG. 4) and the resistor 122 (not shown in FIG. 4) may be disposed on a support, and the support may be controlled to adjust the distance D5 between the edge E5 of the power zone block 111 and the signal trace 112e in a range of 1~10 micrometer.

In summary, the noise simulation system 100 can generate the simulation noise on the power zone block 111, 111a and 111b of the substrate 110 (i.e. printed circuit board), by transmitting the alternating current signal over the signal trace 112, 112a~112f respectively adjacent to the edge E1~E8 of the power zone block 111, 111a and 111b, to simulate the power supply noise in actual situation which is hard to generated by the power supply in lab. Furthermore, when the signal generating circuit 120 of the noise simulation system 100 adjusts the frequency of the alternating current signal, the waveform of the simulation noise on the power zone block 111, 111*a* and 111*b* can be detected to determine the resonance frequency of the power zone block 111, 111*a* and 111*b*.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A system capable for simulating a noise on a power zone block of a substrate, wherein the system comprising:
   a signal trace, disposed in a slit of the power zone block, wherein the signal trace is disposed entirely in the same conductive layer as the power zone block, and wherein the signal trace extends in parallel with a side of the slit of the power zone block; and
   a signal generating circuit, electrically coupled to the signal trace, configured to transmit an alternating current signal over the signal trace to induce a simulated noise with a waveform corresponding to a frequency of the alternating current signal on the power zone block.

2. The system of claim 1, wherein the signal generating circuit is further configured to adjust the frequency of the alternating current signal, according to the waveform of the simulated noise, to determine a resonance frequency of the power zone block.

3. The system of claim 1, wherein a distance between the signal trace and the side of the slit on the power zone block is less than a threshold value, such that the simulated noise on the power zone block is induced from the alternating current signal transmitted over the signal trace, wherein the threshold value is less than 10 micrometer.

4. The system of claim 1, further comprising:
   a resistor, with a first terminal electrically coupled to the signal trace, and a second terminal is grounded.

5. The system of claim 4, wherein a resistance of the resistor is controlled to form a standing wave on the signal trace according to the alternating current signal.

6. The system of claim 1, wherein the power zone block is disposed in a power layer of the substrate.

7. The system of claim 1, wherein a plurality of memory cell is configured to install on an element interface of the substrate.

8. The system of claim 1, wherein the alternating current signal is a single-end signal.

* * * * *